United States Patent [19]

Schwarz

[11] Patent Number: 4,763,061
[45] Date of Patent: Aug. 9, 1988

[54] PRIMARY SWITCHED-MODE DC-DC CONVERTER WITH SUMMED INPUT CURRENT AND INPUT VOLTAGE RESPONSIVE CONTROL

[75] Inventor: Gerhard Schwarz, Altena, Fed. Rep. of Germany

[73] Assignee: Braun Aktiengesellschaft, Kronberg, Fed. Rep. of Germany

[21] Appl. No.: 38,816

[22] Filed: Apr. 15, 1987

[30] Foreign Application Priority Data

May 30, 1986 [DE] Fed. Rep. of Germany ....... 3618221

[51] Int. Cl.[4] .............................................. H02J 7/10
[52] U.S. Cl. ...................... 320/32; 320/39; 363/19
[58] Field of Search ............ 363/18, 19, 142, 97; 320/2, 3, 21, 32, 39

[56] References Cited

U.S. PATENT DOCUMENTS

| 4,504,775 | 3/1985 | Becker | 363/19 |
| 4,523,139 | 6/1985 | Schwarz et al. | 320/40 |
| 4,652,984 | 3/1987 | van der Akker et al. | 363/19 |

FOREIGN PATENT DOCUMENTS

| 3311737 | 10/1984 | Fed. Rep. of Germany. | |
| 3323747 | 1/1985 | Fed. Rep. of Germany | 363/19 |
| 62774 | 4/1982 | Japan | 363/19 |

OTHER PUBLICATIONS

"Applikationsbuch Band 2" (Application Manual, vol. 2), second edition, issued by Texas Instruments Deutschland GmbH, 1978, pp. 132 to 135, in particular FIGS. 19 and 20.

*Primary Examiner*—William H. Beha, Jr.

[57] ABSTRACT

The invention is directed to a switching power supply with a primary switched-mode direct-current converter, in which the conductivity of a transistor (2) driving the base of a switching transistor (1) is operated on by the sum of two control signals. The sum of these control signals is generated by two low-resistance voltage sources in series arrangement, the sources being proportional to the emitter current and the input voltage, respectively.

7 Claims, 2 Drawing Sheets

This invention relates to a switching power supply with a primary switched-mode direct-current converter for supplying regulated power to an electrical load from an input voltage source of different voltage levels, in which the primary coil of a transformer is connected to the input voltage source via the main circuit of a first controllable semiconductor and a first resistor, in which a secondary coil of the transformer supplies power to the load and a secondary feedback is provided to the control electrode of the first controllable semiconductor, and in which the conductivity of a second controllable semiconductor having its main circuit connected between the control electrode of the first controllable semiconductor and the one terminal of the input voltage source is adapted to be operated on by two control signals, with the first control signal being proportional to the primary current flowing through the primary coil while the second control signal obtained on the primary side is proportional to the input voltage.

A circuit arrangement of this type is known from "Applikationsbuch Band 2" (Application Manual, Volume 2), second edition, issued by Texas Instruments Deutschland GmbH, 1978, pages 132 to 135, in particular FIGS. 19 and 20. In this circuit arrangement, the second control signal which is proportional to the input voltage is obtained from a voltage divider comprised of two resistors (R5/R6 in FIG. 19), the voltage divider being connected between the two terminals of the input voltage source, and is fed to the control electrode of a thyristor as a second controllable semiconductor. Through a further resistor, the first control signal which is proportional to the primary current is likewise applied to the control electrode of the thyristor. Since the purely resistor-type voltage divider is connected across the input voltage source and has to be comparatively lowresistance in dependence upon the input impedance of the second controllable semiconductor and the lead impedance of the first control signal, a relatively high power lows results particularly at high input voltages. In this arrangement, the secondary feedback to the control electrode of the first controllable semiconductor is accomplished through a second secondary coil (N1).

It is an object of the present invention to reduce the power loss in a switching power supply of the type initially referred to.

This object is accomplished by providing between the other terminal of the input voltage source and the junction of the first resistor and a main electrode of the first controllable semiconductor a circuit arrangement including a capacitor having at its one end the sum of the two control signals, which sum operates on the conductivity of the second controllable semiconductor.

This solution of the invention enables the output current to be maintained constant at a low loss over a wide input voltage range of about 1:3, that is, of between 100 volts and 300 volts, for example.

By suitably dimensioning the circuit arrangement of the invention in which the second control signal which is proportional to the input voltage is directly gained from the primary circuit of the converter arrangement, the power loss is reduced as compared with such circuit arrangements in which this control signal is obtained from the full secondary coil of the converter arrangement.

In an advantageous embodiment of the invention, the second controllable semiconductor is a transistor. In the Texas Instruments Application Manual initially referred to, the second controllable semiconductor is a thyristor because it requires less control current than a transistor, which eliminates the need for the voltage divider to be extremely low-resistance (incurring a still higher power loss). By contrast, the solution of the invention permits the use of a transistor in spite of its high resistance with respect to direct current, because the control signal proportional to the input voltage is produced at a capacitor representing a lowresistance voltage source for turning on the second controllable semiconductor. In the publication referred to, the two control signals are applied to the thyristor control electrode in parallel arrangement via resistors which requires these resistors to be matched and to be relatively low-resistance.

Further advantageous embodiments of the invention are indicated in the other subclaims.

One embodiment of the invention will be explained in more detail in the following with reference to the accompanying drawings, in which.

Figure 1:
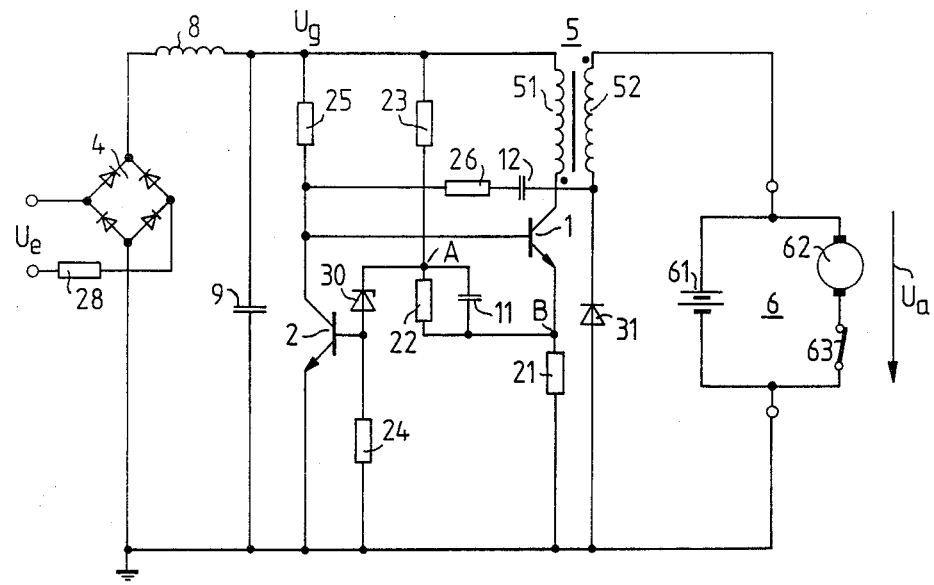
FIG. 1 is an electrical schematic illustrating the embodiment incorporating a motor and an accumulator as the load, in which the primary current does not flow through the load.

The switching power supply illustrated in FIG. 1 includes a primary switched-mode blocking oscillator type converter with a transformer 5 and a first transistor 1 as well as a diode 31 provided in the load circuit, the diode being of such polarity that the energy stored in the transformer 5 during the off period of the first transistor is discharged to the load 6 which in this embodiment is comprised of an accumulator 61 and a direct-current motor 62 adapted to be connected to the accumulator 61 via a switch 63. If the load is only comprised of a direct-current motor excluding an accumulator, a capacitor has to be connected in parallel with the motor for smoothing the output voltage. The blocking oscillator type converter is energized, via a bridge rectifier 4 and a resistor 28, from a direct-current or alternating-current supply the voltage of which may range between 100 and 250 volts, in extreme cases even 12 volts, and the frequency of which may be nearly arbitrary where an AC supply is used. The rectified output voltage is applied to the input of the blocking oscillator type converter or the electronic control means via a series choke 8 and a parallel capacitor 9.

The rectified voltage $U_g$ is applied to the series circuitry comprised of the primary coil 51 of the transformer 5, the collector-emitter circuit of the first transistor and the first resistor 21. The base of the first transistor 1 is connected to the one terminal of the secondary coil 52 of the transformer 5 through a resistor 26 and a capacitor 12 in series arrangement, in addition to connecting through a resistor 25 with the positive potential of the rectified voltage $U_g$. Further, the base of the first transistor 1 is connected to ground or reference potential through the collectoremitter circuit of a second transistor 2.

The emitter of the first transistor is connected to ground or reference potential through the first resistor 21. The junction, identified by B, of the emitter of the first transistor 1 and the first resistor 21 is connected to the positive terminal of the input voltage source through a capacitor 11 in parallel arrangement with a second resistor 22, and a further resistor 23. The junction of the resistor 23 and the parallel circuit comprised of capacitor 11 and resistor 22 is identified by A, being connected through a zener diode 30 to the base of the second transistor 2. The base of transistor 2 is connected to reference potential through a resistor 24. The zener diode 30 permits the switching threshold of the transistor 2 to be defined more closely. If the zener diode 30 in FIG. 1 is omitted, in which case the base of transistor 2 is directly connected to junction A, resistor 24 is also omitted. In this case, the value of resistor 21 becomes correspondingly smaller, its dimensioning remaining, however, unchanged.

The direction of winding of the primary and secondary coil 51 and 52, respectively, of the transformer 5 is determined by the dots shown in the drawing.

Figure 2:
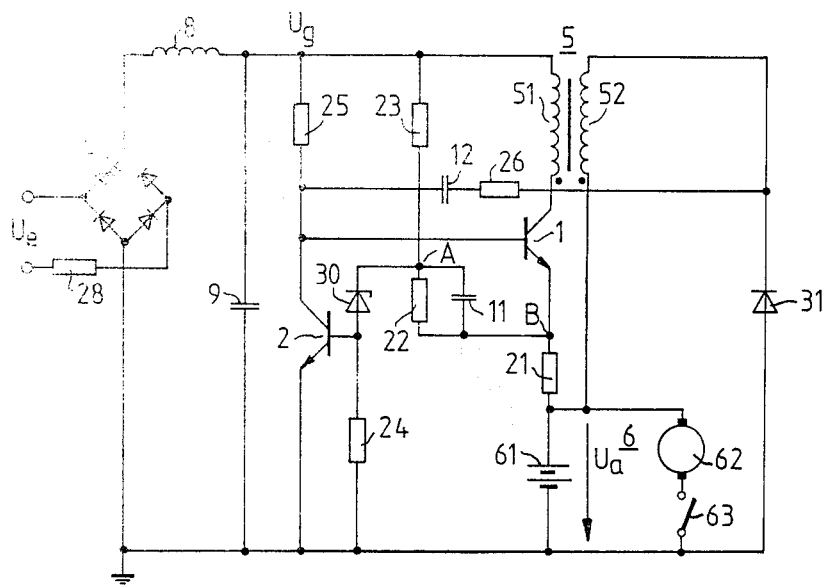
FIG. 2 is an electrical schematic illustrating the embodiment incorporating a motor and an accumulator as the load, in which also the primary current flows through the load.

In accordance with FIG. 2, the circuitry may also be configured such that the accumulator receives not only the secondary current flowing through the secondary coil but also the primary current flowing through the primary coil. As becomes apparent from FIG. 2, the accumulator 61 is inserted between the resistor 21 and the reference potential, and the one end of the secondary coil 52 is connected to the junction of the accumulator 61 and the resistor 21.

The mode of operation of the electronic switching power supply which is identical for both FIG. 1 and FIG. 2 shall be explained in more detail in the following with reference to FIG. 2.

Following rectification of the DC or AC voltage $U_e$ applied to the input of the bridge rectifier 4, a low base current will drive the first transistor 1, which operates as a switching transistor, through the resistor 25, placing the first transistor 1 in its conductive state. Via the resistor 26 and the capacitor 12, a positive feedback effect is produced through the secondary coil 52 of the transformer 5, feeding an additional drive current to the first transistor 1, rendering it fully conducting instantly. The collector current rises linearly, producing a voltage drop proportional to the respective collector current along the first resistor 21. According to FIG. 2, the voltage $U_B$ residing at junction B with respect to reference potential then corresponds to the voltage drop along the resistor 21 plus the accumulator voltage $U_a$ representing the output voltage in this Figure. The voltage lying at the capacitor 11 which voltage is proportional to the input voltage $U_g$ is additive to this voltage $U_B$ which is proportional to the emitter current flowing through the transistor 1. Thus, the voltage $U_A$ residing at junction A with respect to reference potential corresponds to the sum of a voltage proportional to the input voltage $U_e$ or DC voltage $U_g$ and the voltage $U_B$. This addition is realized in the form of two low-resistance voltage sources in series arrangement. When a predetermined peak voltage $U_A$ is reached, the second transistor 2 will be driven via the zener diode 30, thereby going into conduction and connecting the base of the first transistor 1 to ground or reference potential, thus withdrawing the base current from the first transistor 1, cutting it off.

With the beginning of the off period of the first transistor 1, the voltage induced in the secondary coil 52 of the transformer 5 will change its polarity. In accordance with the principle of a blocking oscillator type converter, the energy stored in the transformer 5 is thus delivered to the accumulator 61 via the diode 31.

The resistor 23 may be a very high-value resistor keeping power losses low because only the low charge loss of the capacitor 11 caused by driving the transistor 2 in its relatively long off period has to be compensated for by recharging. Since the capacitor 11 is low resistance for dynamic processes, the transistor 2 receives its control current from two low-resistance voltage sources connected in series.

For the arrangement of FIG. 2, the dimensioning of the components may be selected as follows at an accumulator voltage of $U_a = 2.6$ volts:

Resistor 21 = 18 ohms
Resistor 22 = 5.6 kohms
Resistor 23 = 560 kohms
Resistor 24 = 330 ohms
Capacitor 11 = 33 nanofarads
Breakdown Voltage of Zener Diode 30 = 5.1 volts.

Figure 3:
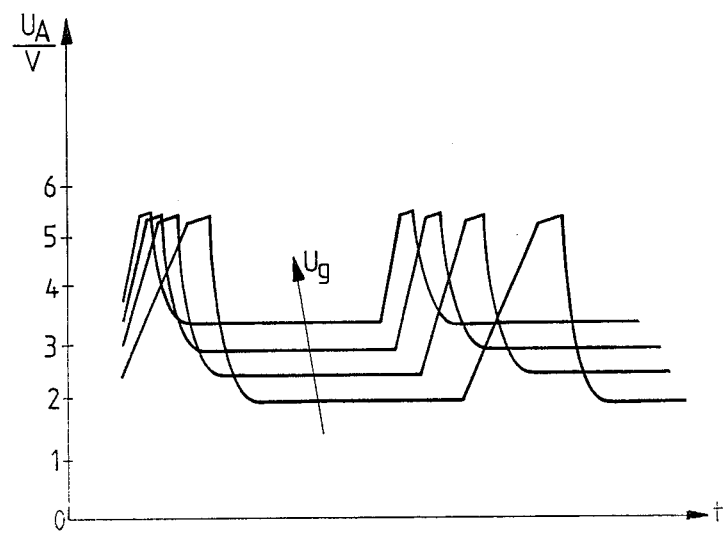
FIG. 3 is a series of waveforms illustrating the various voltages at the capacitor (junction A in FIG. 2) during different input voltage conditions.

For such dimensioning, FIG. 3 shows the various voltages $U_A$ residing at junction A (FIG. 2) at rectified input voltages $U_g$ of 100 volts, 150 volts, 200 volts and 250 volts. As will be seen, switches on at the same voltage $U_A$ (5.2 volts, approximately), thereby cutting off transistor 1, independently of the magnitude of the input voltage $U_g$ applied. The second control signal operates on both the duration and the current amplitude of the conducting state of transistor 1. The waveforms shown are indicative of the sum of the two control signal voltages plus the voltage $U_a$ residing at the accumulator. During periods in which both transistors 1 and 2 are effectively off, the waveforms are horizontal. During these periods, the current through resistor 21, that is, the primary current, is equal to zero. The accumulator voltage $U_a$ then stands at junction B while junction A reflects the sum of the voltage $U_a$ and the voltage of the second control signal which depends on the magnitude of the input voltage.

With transistor 1 starting to conduct, voltage $U_A$ will rise sharply due to the voltage drop along resistor 21 until the switching voltage for transistor 2 is reached. Switching of transistor 2 to its conducting state turns transistor 1 off.

I claim:

1. A switching power supply with a primary switched mode direct current converter for supplying regulated power to an electrical load from an input voltage source of different voltage levels comprising a transformer having a primary coil and a secondary coil, a first controllable semiconductor having a main circuit and a control electrode, means including the main circuit of said first controllable semiconductor and a first resistor for connecting said primary coil of said transformer to an input voltage source, means for connecting said secondary coil of the transformer to said electrical load, and means providing secondary feedback from said secondary coil to the control electrode of said first controllable semiconductor, a second controllable semiconductor having a main circuit and a control electrode, means connecting said main circuit of said second controllable semiconductor between the control electrode of said first controllable semiconductor and one terminal of said input voltage source, and a circuit arrangement provided between the other terminal of said input voltage source and the junction of said first resistor and said main circuit of said first controllable semiconductor, said circuit arrangement including a capacitor that provides at one of its ends the sum of a first control signal proportional to the primary current flowing through said primary coil and a second control signal proportional to the input voltage, said circuit arrangement being connected to the control electrode of said second controllable semiconductor such that the sum of said two control signals operates on the conductivity of said second controllable semiconductor.

2. A switching power supply as claimed in claim 1 wherein said load is comprised of an accumulator and a direct-current motor adapted to be connected in parallel therewith, said load being powered from both the current flowing through said secondary coil and the primary current flowing said primary oil.

3. A switching power supply as claimed in claim 1, wherein said circuit arrangement includes a second resistor connected in parallel with said capacitor and a third resistor connected in series with the parallel connection of said capacitor and said second resistor to said other terminal of the input voltage source, and that the sum of the two control signals can be picked off at the junction between said third resistor and the parallel circuit of said capacitor and said second resistor.

4. A switching power supply as claimed in claim 1 or claim 3, wherein said second controllable semiconductor is a transistor.

5. A switching power supply as claimed in claim 1 wherein said load is comprised of an accumulator and a direct-current motor adapted to be connected in parallel therewith, said load being conencted to said secondary coil through a diode.

6. A switching power supply with a primary switched mode direct current converter for supplying regulated power to an electrical load from an input voltage source of different voltage levels comprising a transformer having a primary coil and a secondary coil, a first controllable semiconductor having a main circuit and a control electrode, means including the main circuit of said first controllable semicondcutor and a first resistor for connecting said primary coil of said transformer to an input voltage source, means for connecting said secondary coil of the transformer to said electrical load, and means providing secondary feedback from said secondary coil to the control electrode of said first controllable semiconductor, a second controllable semiconductor having a main circuit and a control electrode, means connecting said main circuit of said second controllable semiconductor between the control electrode of said first controllable semiconductor and one terminal of said input voltage source, a circuit arrangement provided between the other terminal of said input voltage source and the junction of said first resistor and said main circuit of said first controllable semiconductor, said circuit arrangement including a capacitor that provides at one of its ends the sum of a first control signal proportional to the primary current flowing through said primary coil and a second control signal proportional to the input voltage, and means including a zener diode connecting said circuit arrangement to the control electrode of said second controllable semiconductor such that the sum of said two control signals operates on the conductivity of said second controllable semiconductor.

7. A switching power supply as claimed in claim 6, wherein said load is comprised of an accumultor and a direct-current motor adapted to be connected in parallel therewith, said load being powered from both the current flowing through said secondary coil and the primary current flowing said primary coil.

* * * * *